Jan. 17, 1928.  
C. S. BROWN  
1,656,658  
PUMP OR LUBRICATOR AND SYSTEM  
Filed April 17, 1922 2 Sheets-Sheet 2
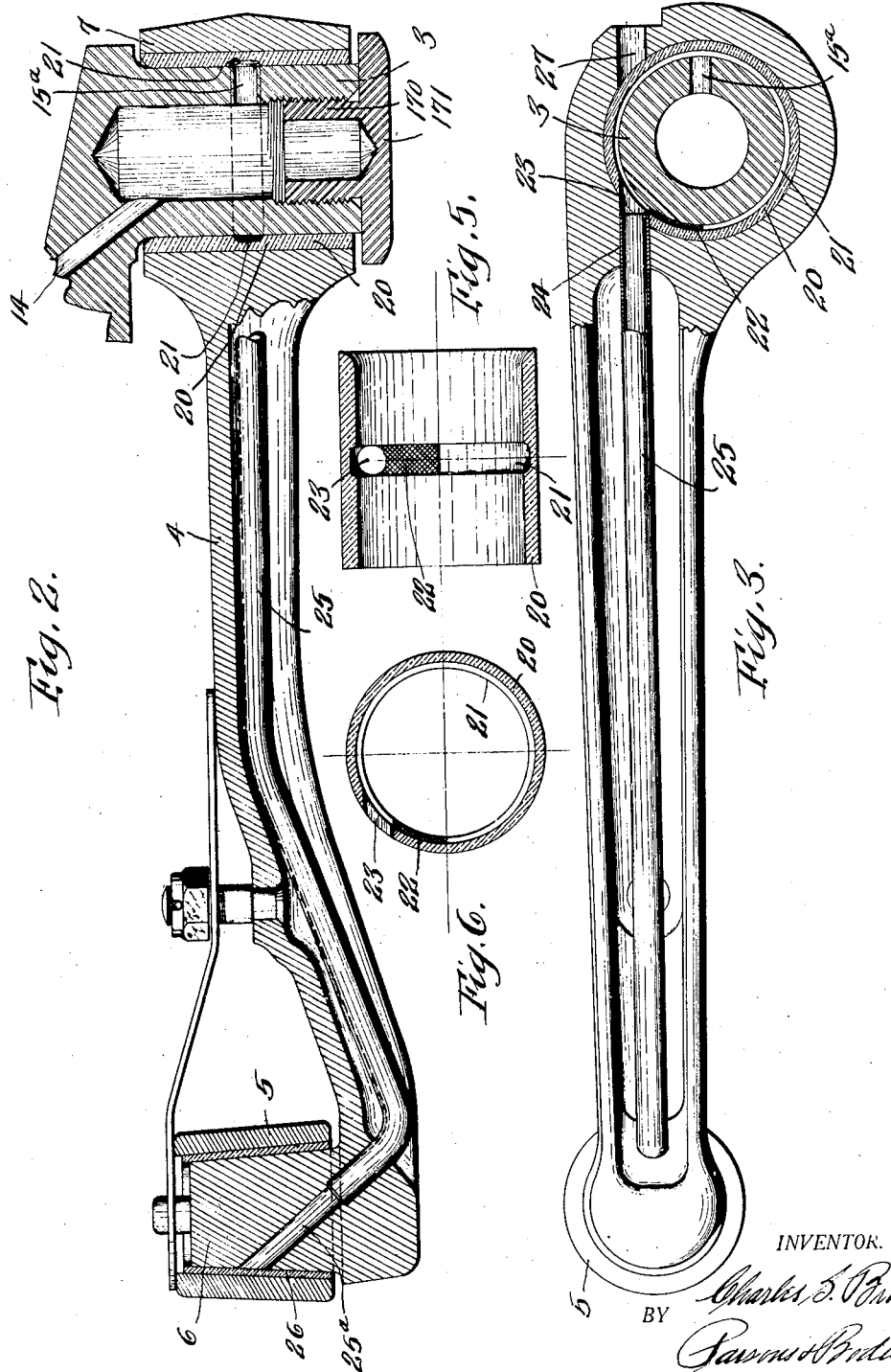
INVENTOR.  
Charles S. Brown.  
BY  
Gaswer & Bidell  
ATTORNEYS.

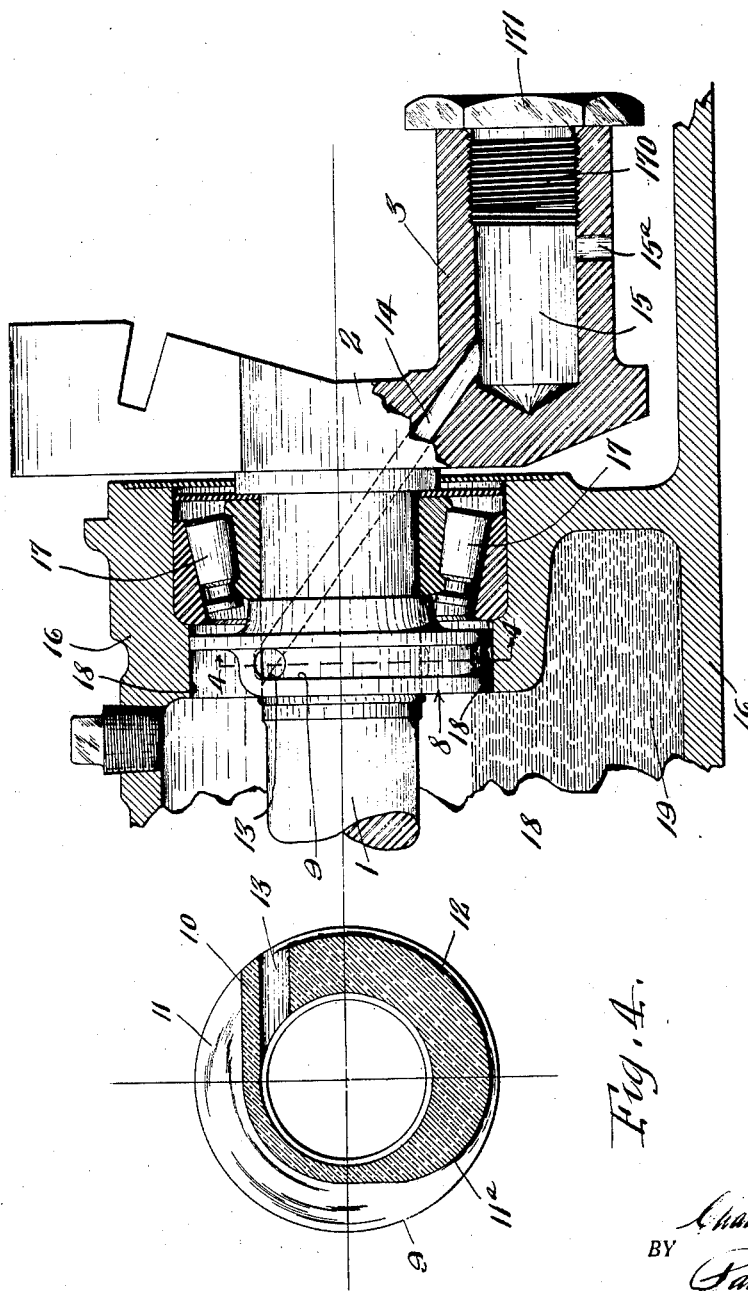

Patented Jan. 17, 1928.

1,656,658

UNITED STATES PATENT OFFICE.

CHARLES S. BROWN, OF SYRACUSE, NEW YORK.

PUMP OR LUBRICATOR AND SYSTEM.

Application filed April 17, 1922. Serial No. 553,425.

This invention has for its object a particularly simple and compact pump or lubricator and lubricating system in which relatively movable parts such as pistons, valves etc. are eliminated.

The invention consists in the novel features and in the combinations and constructions hereinafter set forth and claimed.

In describing this invention, reference is had to the accompanying drawings in which like characters designate corresponding parts in all the views.

Figure 1 is a fragmentary sectional view, partly in elevation, of a mechanism embodying this lubricator and system.

Figure 2 is a longitudinal sectional view, partly in elevation, of an extension of the system shown in Fig. 1, as the lubricating system continued to lubricate the bearing of a connecting rod mounted on the crank pin shown in Fig. 1.

Figure 3 is a sectional view, partly in elevation, taken centrally of Fig. 2.

Figure 4 is a sectional view on line 4—4, Fig. 1.

Figures 5 and 6 are longitudinal and cross sectional views of the detached pump members seen in Fig. 2.

This invention comprises a pump or lubricator and system by which the rotary movement of a rotating member or element forces the oil or fluid from one bearing to another in the series. A similar lubricator in such other bearing may, if desired, force oil to a third bearing etc. each lubricator being a feed for the next bearing in the series.

The invention is here shown as embodied in a mechanism including a shaft having a crank thereon, the crank having a crank pin, which is connected to another part by a pitman or connecting rod, and the mechanism here shown is adapted to reciprocate the knife of an agricultural machine as a mower or binder.

1 designates a rotatable member, as a shaft having a crank 2 thereon provided with a crank pin 3 which is connected by a connecting rod or pitman 4 to a part to be actuated, as the reciprocating knife of a mower or binder, which part has a bearing 5 on the stud 6 at the outer end of the connecting rod 4, the connecting rod having a bearing 7 mounted on the crank pin 3. This crank pin 3 is a rotatable member as it has a rotating movement in the bearing 7 during the movement of the crank 2.

In the illustrated embodiment of my invention, the shaft 1, and the crank pin 3 are connected in series by a lubricant conduit or passage and the crank pin 3 is connected to deliver lubricant to the bearing 5; and the shaft 1 is provided with a pump or lubricator device to force the oil to the crank pin 3 which in turn is provided with a pump or lubricator for delivering some of the oil to the bearing 5.

These lubricators are generally similar in construction, and each comprises a groove extending around the axis of said members, a partition or barrier which divides the groove into receiving or discharge portions, and a discharge passage leading from the discharge portion of the groove near the partition or barrier to the next bearing to be lubricated.

The pump associated with the shaft 1 comprises an inner pump or impulse member here shown as a groove provided in the periphery of a collar or enlargement 8 mounted on the shaft 1, the groove, designated 9, extending circumferentially. The collar or enlargement is also formed with a partition or barrier 10 dividing the groove 9 into a receiving portion 11, and a discharge portion 12, the latter communicating by a passage 13 with a duct or passage 14 extending through the shaft and the crank 2 to the interior of the crank pin 3, which is formed with a hollow oil- receiving chamber 15. The passage 13 leads from the discharge portion of the groove 9 from near the partition or barrier 10, and the receiving portion 11 of the groove 9 is preferably deeper than the discharge portion 12 and contracts as at 11ᵃ as it approaches the discharge portion 12.

The shaft is journaled in a suitable casing 16 having suitable bearings 17 for the shaft, and the casing is formed with a cylindrical bore or chamber 18 for receiving oil which bore is concentric with the shaft 1 and is arranged close to the periphery of the pump or lubricator 8 so that the groove 9 is closed at its outer peripheral side. The casing thus forms the outer member, and the portion formed with the groove 9, the inner member, of a force feed pump or lubricator operated by the relative rotary movement of the shaft and casing.

The oil may be supplied to the bore 18 in any suitable manner and as here shown, this bore 18 communicates with the oil reservoir 19 formed in the casing 16.

The chamber 15 within the crank pin 3 is closed at its outer end by any suitable means here shown as a plug 170 threaded into the outer end of the crank pin 3 and having a head 171 which holds the bearing 7 of the connecting rod 4 from displacement.

The crank pin is also formed with a radially extending outlet passage 15$^a$ leading from the chamber 15 through the periphery of the crank pin.

The crank pin 3 is also provided with a pump or impulse member generally similar to the member 8 associated with the shaft 1, this crank pin member being here shown as comprising a sleeve or bushing 20 on the crank pin formed with an internal annular or circumferential groove 21 in line with the outer end of the passage 15$^a$, the pump member being formed with a barrier or partition 22 dividing the groove into receiving and discharge portions and with a tangentially extending port 23 at the discharge end thereof near the partition 22.

The pump member 20 is arranged with this port 23 in line with a passage 24 formed in the bearing 7 and with the barrier 22 at one side of the passage 24.

A suitable conduit as a pipe 25 connected to the passage 24, extends along the pitman or connecting rod 4 and communicates with a passage or bore 25$^a$ extending through the stud 6 at the other end of the connecting rod, the passage 25$^a$ opening through the periphery of the stud 6 in order to discharge the oil into the bearing 5 or a bushing 26 around the stud.

The bearing 7 is also provided with a bore 27 in line with the passage 24, the bore 27 being merely an extension of the passage 24 and being present only for the reason that in boring the passage 24 the tool is started at the outer end of the bearing and first forms the bore 24.

The shaft 1 and crank pin 3 are rotatable elements having pumps or lubricators coacting in series, the crank pin 3 having a rotating movement relatively to the bearing 7 as the crank pin moves in its orbit.

Thus, each pump or lubricator device associated with the shaft 1 and the crank pin 3 comprises a pair of inner and outer concentric members (casing 16, pump member 8, and crank pin 3 and pump member 20) having relative rotary movement and one rotatably fitting the other, one member of each pair having a circumferential groove 9 or 21 extending around the axes of said members, a barrier or partition 10 or 22 dividing the groove into receiving and discharge portions, and an outlet 13 or 23 leading from the discharge portion from near the barrier.

In operation, during the rotation of the shaft 1, the pump member or portion 8 rotates therewith and the oil scooped into the groove 9 is forced from the receiving portion 11 of the groove into the discharge portion 12 by adhering to the casing 16 and by friction, into the passage 13, thence through the passage 14 into the chamber 15 of the crank pin 3, whence it feeds through the outlet port 15$^a$ into the groove 21 of the pump member 20. It is carried along the groove owing to the relative rotary movement of the crank pin 3 and the member 20 and forced through the port 23, pipe 25 to the periphery of the stud 6. Hence, the oil is positively forced or pumped through the bearings connected in series.

What I claim is:

1. The combination of a shaft having a crank provided with a hollow crank pin, the crank pin having a fluid outlet passage leading from its interior to its periphery, a connecting rod having a bearing on the crank pin, the connecting rod having a bearing at its outer end, a passage connecting the bearings at the ends of the connecting rod, a lubricator mounted on the shaft, a passage extending through the shaft periphery thereof and from the lubricator to the hollow crank pin, and a lubricator member encircling the crank pin for receiving fluid from the outlet passage of the crank pin and forcing the same through the outlet passage of the crank pin into the passage connecting the bearings at the opposite ends of the connecting rod.

2. The combination of a series of rotatable members and casing members paired therewith in which they are journaled, one member of each pair having a groove extending around the axis of the members of such pair, each of such grooved members being formed with a barrier dividing the respective groove into receiving and discharge portions and a discharge passage leading from its groove to the groove of the member of the next pair in the series, substantially as and for the purpose specified.

In testimony whereof, I have hereunto signed my name, at Syracuse, in the county of Onondaga, and State of New York, this 17th day of March, 1922.

CHARLES S. BROWN.